350-96.27
XR 3,818,131
~~TX 3062N~~
TX 3076N

United States Patent
Emmons

[11] 3,818,131

[45] June 18, 1974

[54] FIBER OPTIC CATHODE RAY TUBE WITH ANTI-STATIC DISCHARGE MEANS

[75] Inventor: Lawrence D. Emmons, Santa Clara, Calif.

[73] Assignee: Ampex Corporation, Redwood, Calif.

[22] Filed: Feb. 2, 1970

[21] Appl. No.: 7,466

[52] U.S. Cl......... 178/7.85, 178/DIG. 2; 313/92 LF, 346/110, 350/205
[51] Int. Cl............................................. H01j 29/89
[58] Field of Search............. 350/205; 178/6.7, 6 L, 178/6 CR; 313/92 LF; 346/110

[56] References Cited

UNITED STATES PATENTS 3,167,612 1/1965 Strickholm.................... 178/DIG. 2

*Primary Examiner*—Howard W. Britton
*Assistant Examiner*—Michael A. Masinick

[57] ABSTRACT

A transparent pressure sensitive adhesive tape type insulating layer is bonded to the faceplate of a fiber optic cathode ray tube.

5 Claims, 4 Drawing Figures

3818131
NO OR CLASSIF

INVENTOR.
LAWRENCE D. EMMONS
BY Robert G. Clay
ATTORNEY

FIBER OPTIC CATHODE RAY TUBE WITH ANTI-STATIC DISCHARGE MEANS

FIELD OF THE INVENTION

The present invention relates to fiber optic cathode ray tubes and, more particularly, to a fiber optic cathode ray tube having a static discharge preventive means.

BACKGROUND OF THE INVENTION

In high speed electrostatic printers, sensitized copy sheets, usually photoelectrostatic sheets, are consecutively conveyed past a fiber optic line-scan cathode ray tube. Information carried by the tube's transducing beam is transferred to the photoelectrostatic sheets as a latent image in the form of a charge pattern. The charged sheet is then passed through a developer to develop the latent image and provide a hard copy form of the information carried by the transducing beam.

To transfer the information onto the sensitized sheets, an electron beam generated by the fiber optic cathode ray tube is modulated by a modulation means in accordance with the information. A modulation means suitable for modulating the electron beam is disclosed in my pending application Ser. No. 800,990, filed Feb. 20, 1969, entitled "INTELLIGENCE TRANSDUCING BEAM MODULATION METHOD AND APPARATUS" and assigned to the assignee of this application. The information modulated electron beam is directed by common magnetic focusing and deflecting means to impinge an electroluminescent screen contiguous with the back surface of a fiber optic faceplate. The electroluminescent screen responsively generates light at an intensity proportional to the current of the impinging modulated electron beam. The generated light is transmitted by the fiber optics of the faceplate to impinge the sensitized sheet being conveyed over the front surface of the fiber optic faceplate. To insure that the light transmitted by the fiber optics of the faceplate is in focus when impinging on the sensitized sheets, the sheets are conveyed in direct contact with the faceplate.

As the sensitized sheets are conveyed over the faceplate, static discharges have been found to occur between the cathode ray tube and the contacting sensitized sheets. While the nature and origin of these static discharges are not completely understood, they have a deleterious effect on the quality of the image transduced onto the sheets. These static discharges cause the formation of splotches and blemishes in the developed image.

Considerable advantage is therefore to be gained by preventing the occurrence of static discharges between fiber optic cathode ray tubes and photoelectrostatic copy sheets. Additional advantages are to be gained by preventing such static discharges without significant loss of image definition.

SUMMARY OF THE INVENTION

Accordingly, it is an object of this invention to prevent static discharges between a fiber optic cathode ray tube and sensitized copy sheets conveyed therepast for scanning by the tube's transducing beam.

Another object of this invention is to prevent static discharges between a fiber optic cathode ray tube and sensitized copy sheets without significant loss of image definition.

A further object of this invention is to utilize a low friction static discharge preventive means in a fiber optic cathode ray tube so that sensitized copy sheets can be rapidly conveyed past the tube's faceplate without being attracted to and, thereby, tending to cause the sheets to cling to the faceplate.

In accordance with the present invention, it has been found the foregoing objects can be realized by providing a transparent insulating layer of pressure sensitive adhesive tape between the fiber optic faceplate of the fiber optic cathode ray tube and the sensitized copy sheets conveyed over the fiber optic faceplate for scanning by the transducing beam of the tube. In a preferred embodiment, the transparent pressure sensitive adhesive tape is bonded to the surface of the fiber optic faceplate over which the sensitized sheets are conveyed. Other transparent material insulating layers may be employed. means could be provided to support the sensitized sheets spaced above the fiber optic faceplate as they are transported therepast. However, because the dielectric breakdown voltage of most transparent pressure sensitive adhesive tapes is greater than air, it is not necessary to convey the sheets along a path spaced above the transparent insulating layer. This is particularly important to the avoidance of losing significant image definition. In most fiber optic cathode ray tubes, it is possible to convey the sensitized sheets through a zone extending a few mils above the fiber optic faceplate without losing image definition as a result of defocusing. Transparent pressure sensitive adhesive tapes have been found particularly useful in preventing static discharges without a significant loss of image definition.

BRIEF DESCRIPTION OF THE DRAWING

The foregoing and other advantages and features of the present invention will become more apparent from the following description and claims considered together with the accompanying drawing of which:

DESCRIPTION OF THE PREFERRED EMBODIMENT

Figure 1:
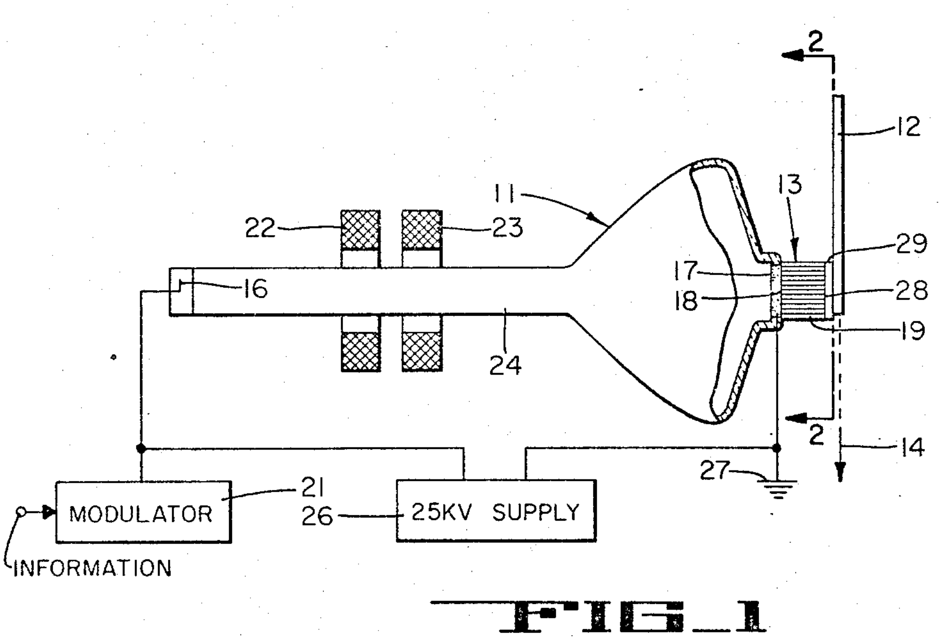
FIG. 1 is a diagram, partly in schematic form, of one embodiment of the fiber optic cathode ray tube of the present invention.
Figure 2:
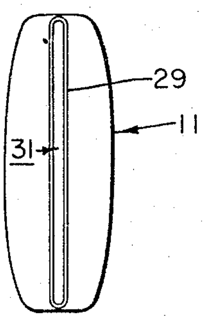
FIG. 2 is a front view of the fiber optic cathode ray tube of FIG. 1 taken along line 2—2.

Referring to FIG. 1, a line-scan fiber optic cathode ray tube 11 employed in high speed electrostatic printers is illustrated. Photoelectrostatic sensitized copy sheets 12 are conveyed over a fiber optic faceplate 13 along a path indicated by arrow 14. A latent image is transferred to the photoelectrostatic copy sheets 12 as a charge pattern in accordance with the information carried by the fiber optic cathode ray tube's electron beam. The charged copy sheets 12 are passed through a developer (not shown) to develop the latent image and provide a hard copy form of the information carried by the transducing beam. Latent images are transduced onto the copy sheets 12 by directing an electron beam provided by the cathode 16 of the tube 11 to impinge on an electroluminescent screen 17. Ordinarily, the electroluminescent screen 17 is in the form of a coating of phosphor deposited on the rear surface 18 of the fiber optic faceplate 13. The phosphor screen 17 generates localized light in response to the impinging electron beam. The intensity of the generated light is proportional to the instaneous current of the impinging electron beam. This light is transmitted and focused by the fiber optics 19 onto the photoelectrostatic copy sheet 12 being conveyed over the fiber optic faceplate 13.

To transduce information onto the photoelectrostatic copy sheets 12, a modulator 21 is coupled to modulate the current of the electron beam generated at the cathode 16. The modulated electron beam issued by cathode 16 is focused onto and deflected across the phosphor screen 17 by focus and deflection coils 22 and 23 respectively provided around the neck 24 of the tube 11. To accelerate the modulated electron beam to the desired energy level preparatory to impinging the phosphor screen 17, an accelerating voltage, e.g., 25k volts, provided by a supply 26, is impressed between the cathode 16 and the phosphor screen 17. In the illustrated embodiment, the phosphor screen 17 is at ground 27 and the cathode 16 is depressed to a negative 25k volts. My pending application Ser. No. 800,954 filed Feb. 20, 1969, entitled "MAINTAINING SPACING BETWEEN SHEETS FROM AND ONTO WHICH DOCUMENT IMAGES ARE TRANSDUCED" and assigned to the assignee of this application describes one technique for modulating and deflecting the electron beam of a linescan fiber optic cathode ray tube used in high speed electrostatic printers.

During the transduction of information onto the photoelectrostatic copy sheets 12, the sheets are conveyed over and in direct contact with the fiber optic faceplate 13. Often, static discharges occur between the fiber optic cathode ray tube 11 and copy sheets 12 which causes the formation of splotches and belmishes in the transduced image. While the reasons for these static discharges are not completely understood, it is known that the material forming the fiber optics 19 is slightly conductive. As a result of being slightly conductive, it is believed that static discharges occur for either of the following reasons. The fiber optics 19 may conduct charge to and, thereby, allow static charge to build up on the front surface 28 of the fiber optic faceplate 13. When sufficient static charge has accumulated on the front surface 28, a static discharge may occur between it and the contacting copy sheet 12. Alternatively, because the copy sheets 12 are charged to about 300 to 400 volts, the static discharge may occur from the copy sheets 12 to the slightly conductive fiber optic faceplate 13.

Referring to FIGS. 1–4, it has been found that static discharges can be prevented by placing a transparent insulating layer of pressure sensitive adhesive tape 29 between the front surface 28 of the fiber optic faceplate 13 and the path 14 over which the photoelectrostatic copy sheets 12 are conveyed. While various transparent insulating layers can be employed to form the static discharge preventive layer 29, a particular transparent pressure sensitive adhesive tape manufactured by Minnesota Mining and Manufacturing Company has been found to be particularly useful as a static discharge preventive layer 29. The transparent pressure sensitive adhesive particularly useful in preventing the static discharges is sold by Minnesota Mining and Manufacturing Company under the name Scotch brand Magic Transparent tape and the U.S. Pat. Nos. 2,532,011; 2,607,711; 2,693,918; and RE 24,906. This transparent pressure sensitive adhesive tape is particularly useful in preventing the static discharges because of its thinness, i.e., approximately 3 mils, and because it presents a rough surface 31 to the photoelectrostatic copy sheet 12 conveyed over the fiber optic cathode ray tube 11.

The thinness of the transparent insulating layer 29 is important to the ensurance that the photoelectrostatic copy sheets 12 will be conveyed along a path through the useful zone of the tube's focus extending above the front surface 28 of the fiber optic cathode ray tube 11. The depth of the useful zone of the tube's focus depends upon the degree of resolution desired. As the copy sheet 12 is moved further from the front surface 28 of the fiber optic faceplate 13, there is a decrease in the ability to resolve an image on the sheet 12. In one embodiment of the tube 11 of the present invention, a strip of the Scotch brand Magic Transparent Tape Number 810 type adhesive tape 29 was placed on the front surface 28 of the fiber optic faceplate 13 of a line-scan fiber optic cathode ray tube manufactured by Litton Industries, inc., and identified as Fiber Optic CRT L-4186. For resolving 8-point futura medium print, the depth of the Litton tube's useful zone of focus above the front surface 28 of the fiber optic faceplate 13 is about 4 mils. Hence, even with the interposition of the above mentioned Scotch Brand transparent pressure sensitive adhesive tape 29, the photoelectrostatic copy sheets 12 will be conveyed through the tube's useful zone of focus.

Figure 3:
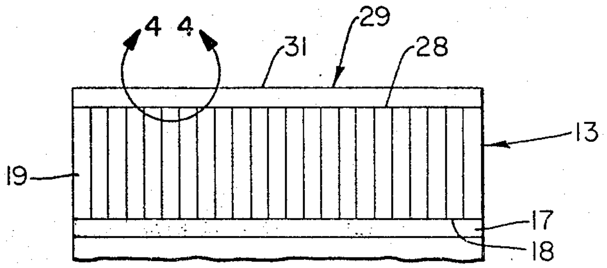
FIG. 3 is cross-sectional view of the fiber optic faceplate of the fiber optic cathode ray tube of FIG. 1.
Figure 4:
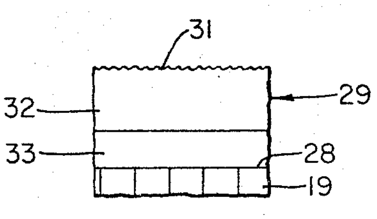
FIG. 4 is an enlarged fragmentary view of the portion of the fiber optic faceplate delineated by lines 4—4 in FIG. 3.

With particular reference to FIGS. 3 and 4, the Scotch brand Magic Transparent Tape No. 810 adhesive tape 29 includes thin flexible backing 32 onto which is coated a pressure sensitive adhesve material 33. The transparent pressure sensitive adhesive tape 29 is placed over in covering relation with the front surface 28 of the fiber optic faceplate 13 and is bonded thereto by the adhesive coating 33. The exposed surface 31 of the backing 32 is roughened to, thereby, provide a low friction surface for contacting the photoelectrostatic copy sheets 12. This low friction rough surface 31 inhibits the tendency of the copy sheets 12 to cling to the contacting surface of the tube 11. By inhibiting the tendency of the photoelectrostatic copy sheets 12 to cling to the contacting surface of the tube 11, jamming problems are avoided.

Another transparent pressure sensitive adhesive tape which can be employed as a static discharge preventive layer is manufactured by Minnesota Mining & Manufacturing Company and is identified as Scotch brand Transparent Tape. This transparent pressure sensitive adhesive tape is indicated as being described in the U.S. Pat. Nos. 2,607,711; 2,693,918; 2,772,794; 2,929,105; and 3,318,852. However, this adhesive tape is thicker than the aforedescribed Scotch brand Magic Transparent Tape No. 810 and, with respect to resolving 8-point futura medium print, presents some loss of image definition. While the thickness of commonly available transparent pressure sensitive adhesive tapes varies, such tapes can be specially manufactured to have a thickness suitable for preventing the static discharges while enabling the resolution of the desired number of lines per inch. As long as transparent insulating materials having a dielectric breakdown voltage of at least 200 volts per mil are selected for the layer 29, the layer can be made thin enough so that there is no significant loss of image definition when placed in front of the tube 11.

What I claim is:

1. A fiber optic cathode ray tube for transferring images onto copy sheets at a resolution of a selected number of lines per inch, said tube having a cathode for generating a beam of electrons, a beam focusing and deflecting means, an electroluminescent screen positioned in the path of the beam for generating localized light in response to the impinging beam and a fiber optic faceplate having a front surface and positioned over said electroluminescent screen for transmitting the generated light to said front surface, said tube having a useful zone of focus extending a predetermined distance above said front surface of the faceplate within which the selected number of lines per inch can be resolved and through which copy sheets are conveyed along a defined path, the combination therewith comprising insulating transparent pressure sensitive adhesive tape disposed only within the useful zone of focus in covering relation with said front surface of said fiber optic faceplate between said front surface and said defined path.

2. The fiber optic cathode ray tube according to claim 1 wherein said pressure sensitive adhesive tape is bonded to said front surface of said fiber optic faceplate.

3. The fiber optic cathode ray tube according to claim 2 wherein sa,d transparent pressure sensitive adhesive tape has a backing and a coating of pressure sensitive adhesive on one side thereof, said adhesive coating contacting said front surface of said fiber optic faceplate to bond said tape thereto.

4. The fiber optic cathode ray tube according to claim 3, wherein said tape is Scotch brand Magic Transparent Tape.

5. The fiber optic cathode ray tube according to claim 1, wherein said pressure sensitive adhesive tape has a surface for contacting said copy sheets which is rough.

* * * * *